E. F. HULBERT.
MACHINE FOR FORMING SHELLS OF PAPER OR THE LIKE.
APPLICATION FILED DEC. 27, 1917. RENEWED OCT. 25, 1920.
1,380,103.
Patented May 31, 1921.
9 SHEETS—SHEET 2.
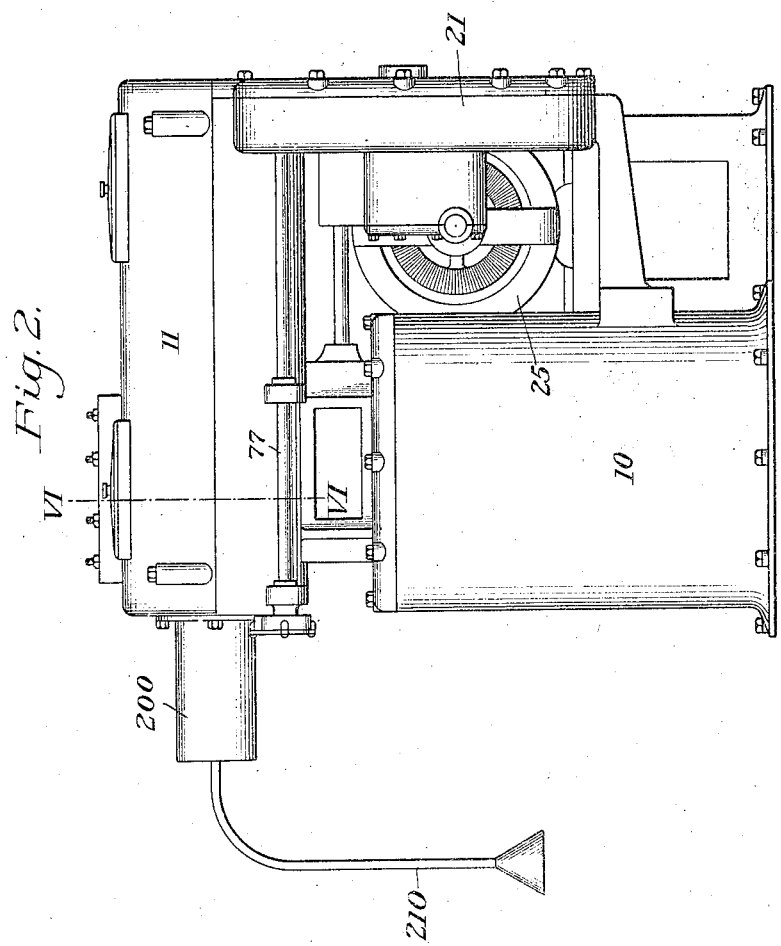

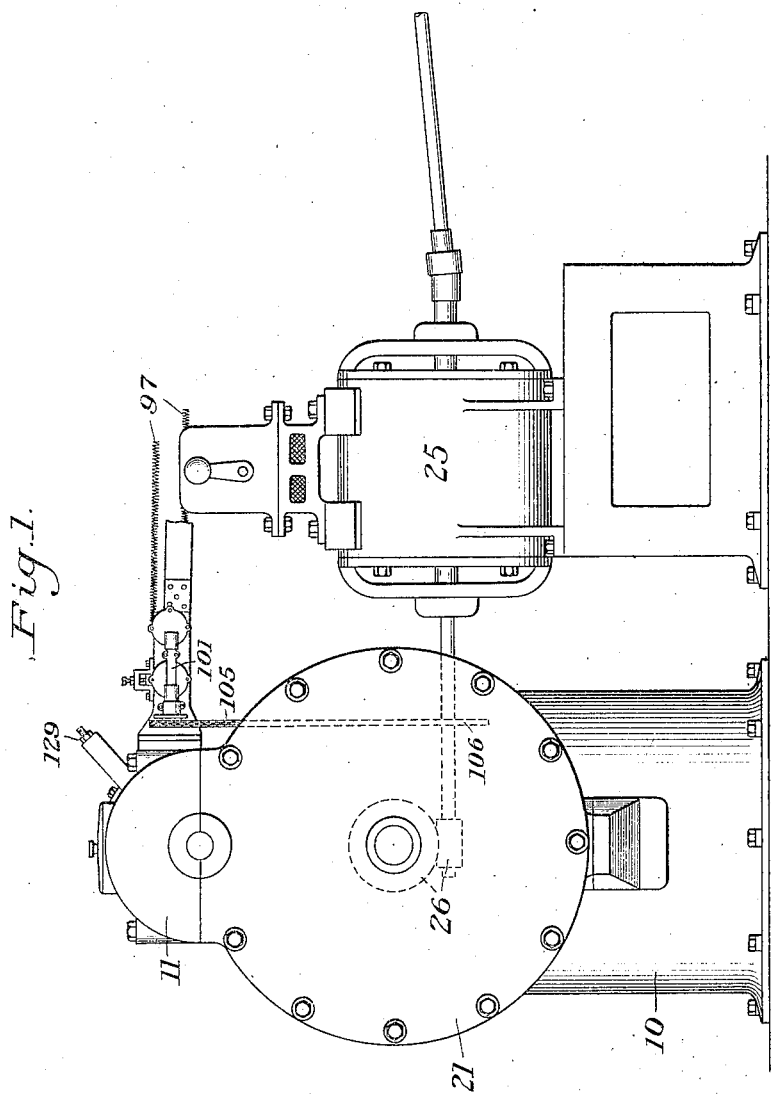

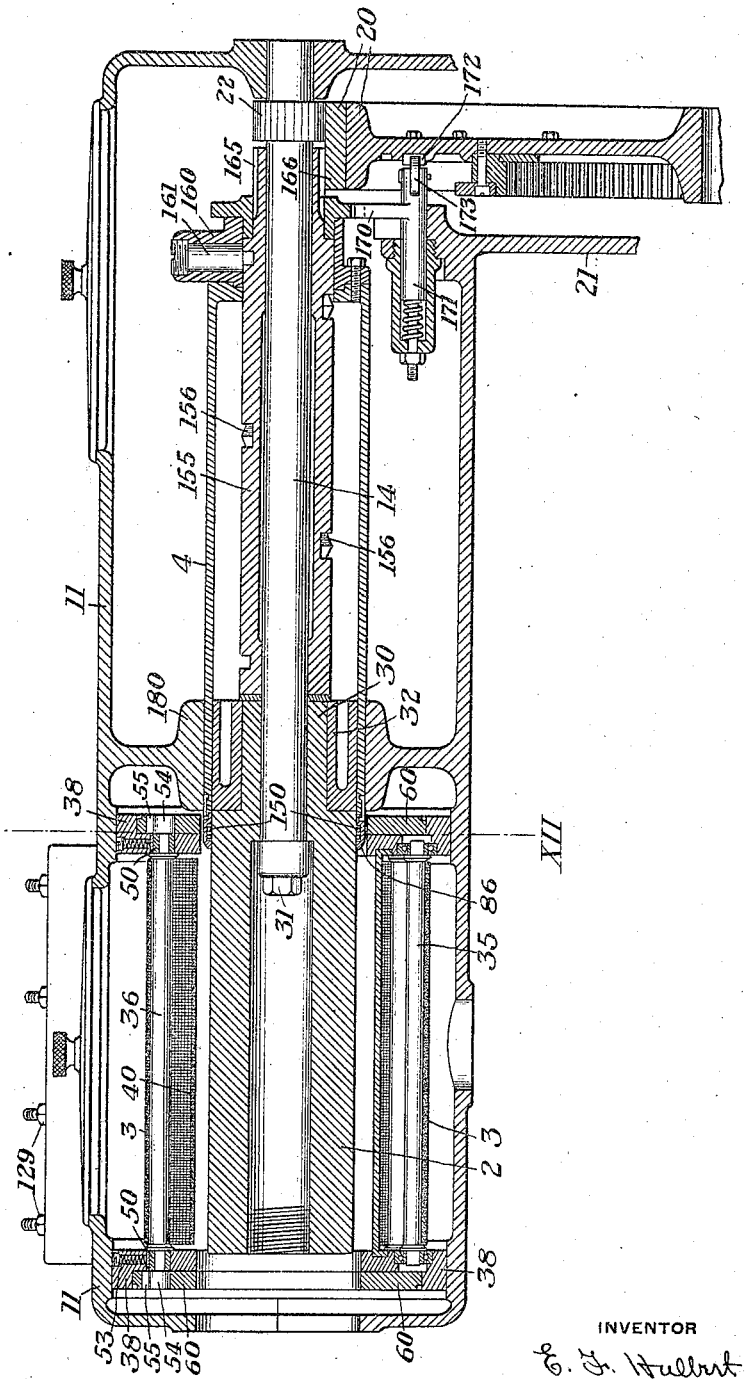

E. F. HULBERT.
MACHINE FOR FORMING SHELLS OF PAPER OR THE LIKE.
APPLICATION FILED DEC. 27, 1917. RENEWED OCT. 25, 1920.
1,380,103.
Patented May 31, 1921
9 SHEETS—SHEET 4.
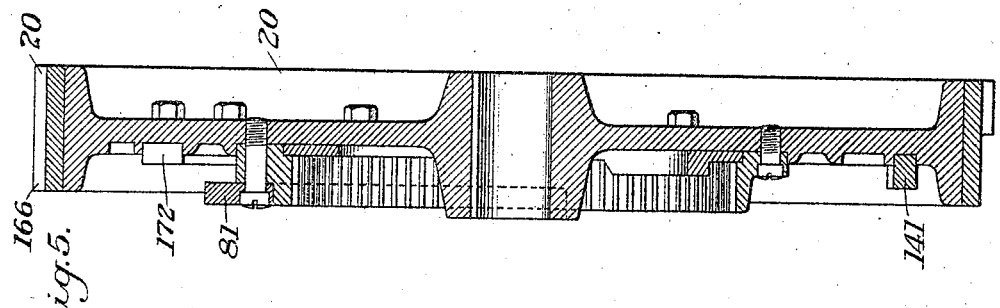
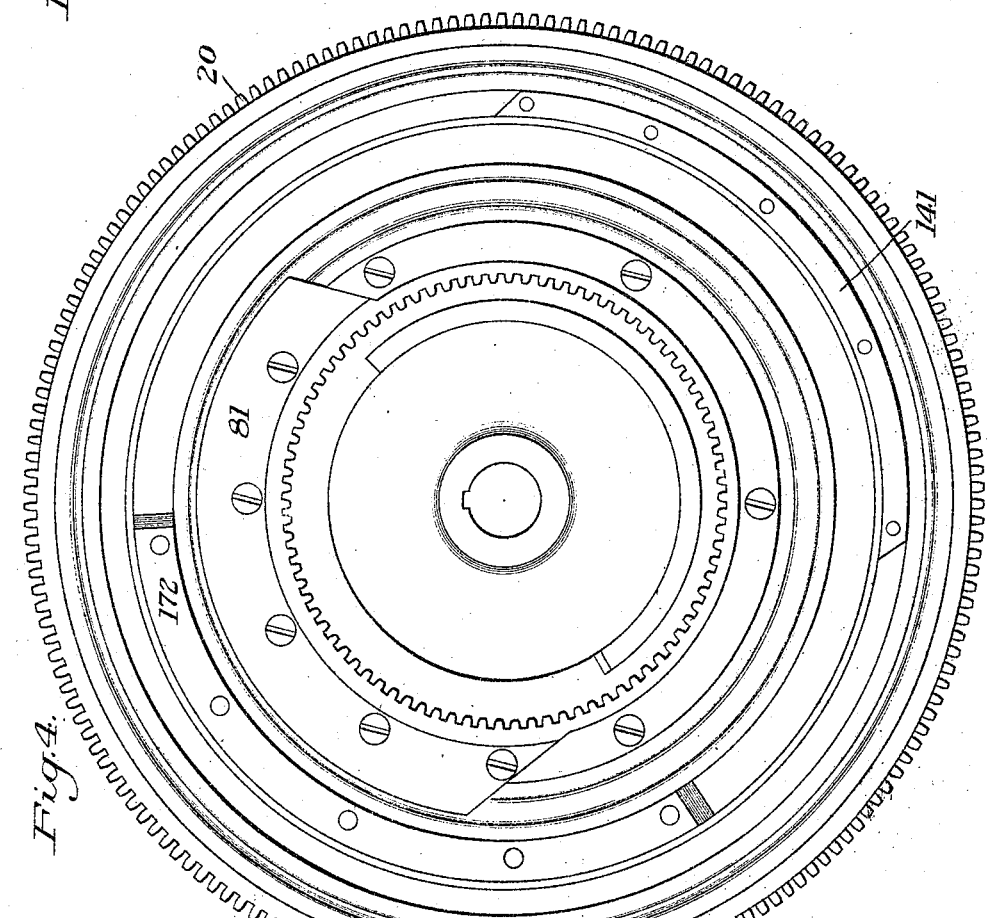

E. F. HULBERT.
MACHINE FOR FORMING SHELLS OF PAPER OR THE LIKE.
APPLICATION FILED DEC. 27, 1917. RENEWED OCT. 25, 1920.
1,380,103.
Patented May 31, 1921.
9 SHEETS—SHEET 5.
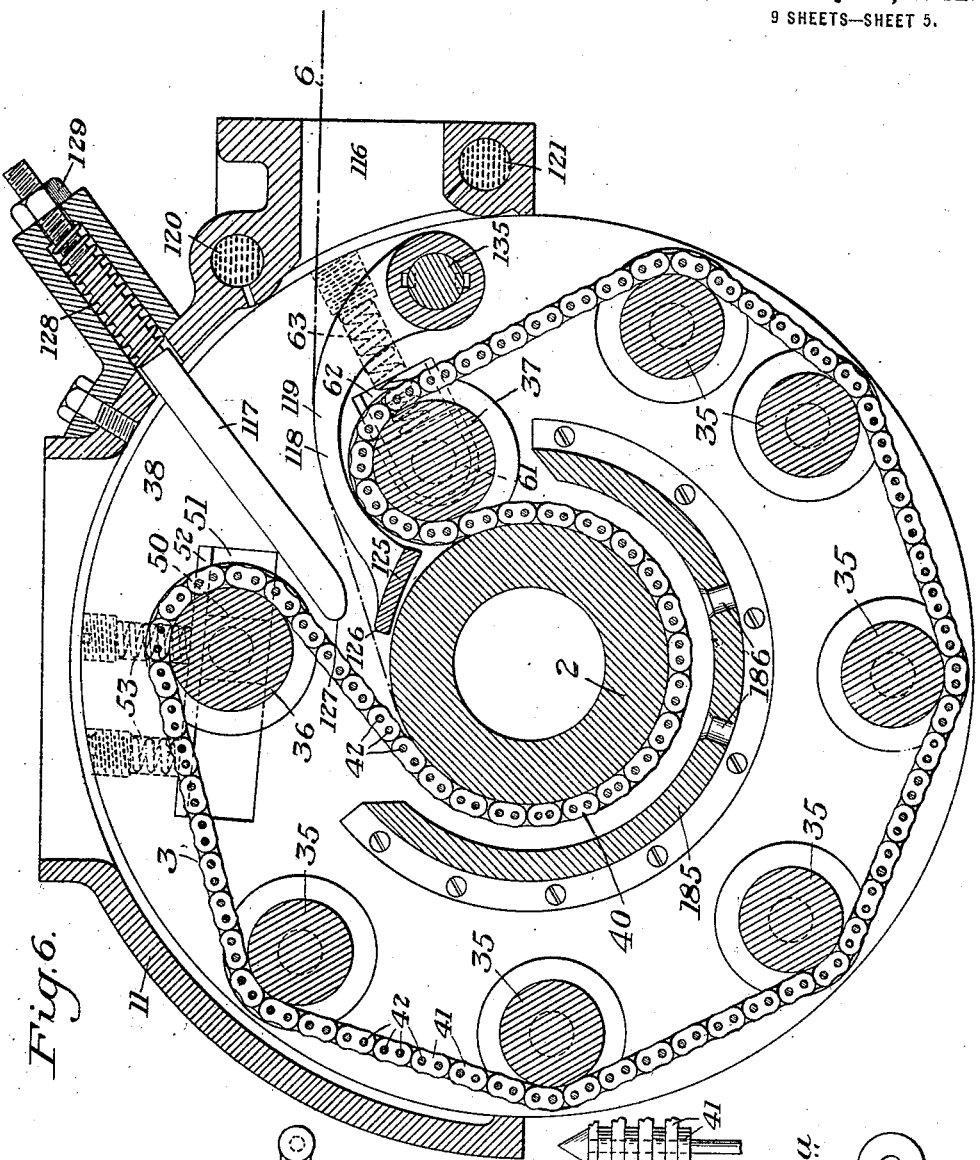

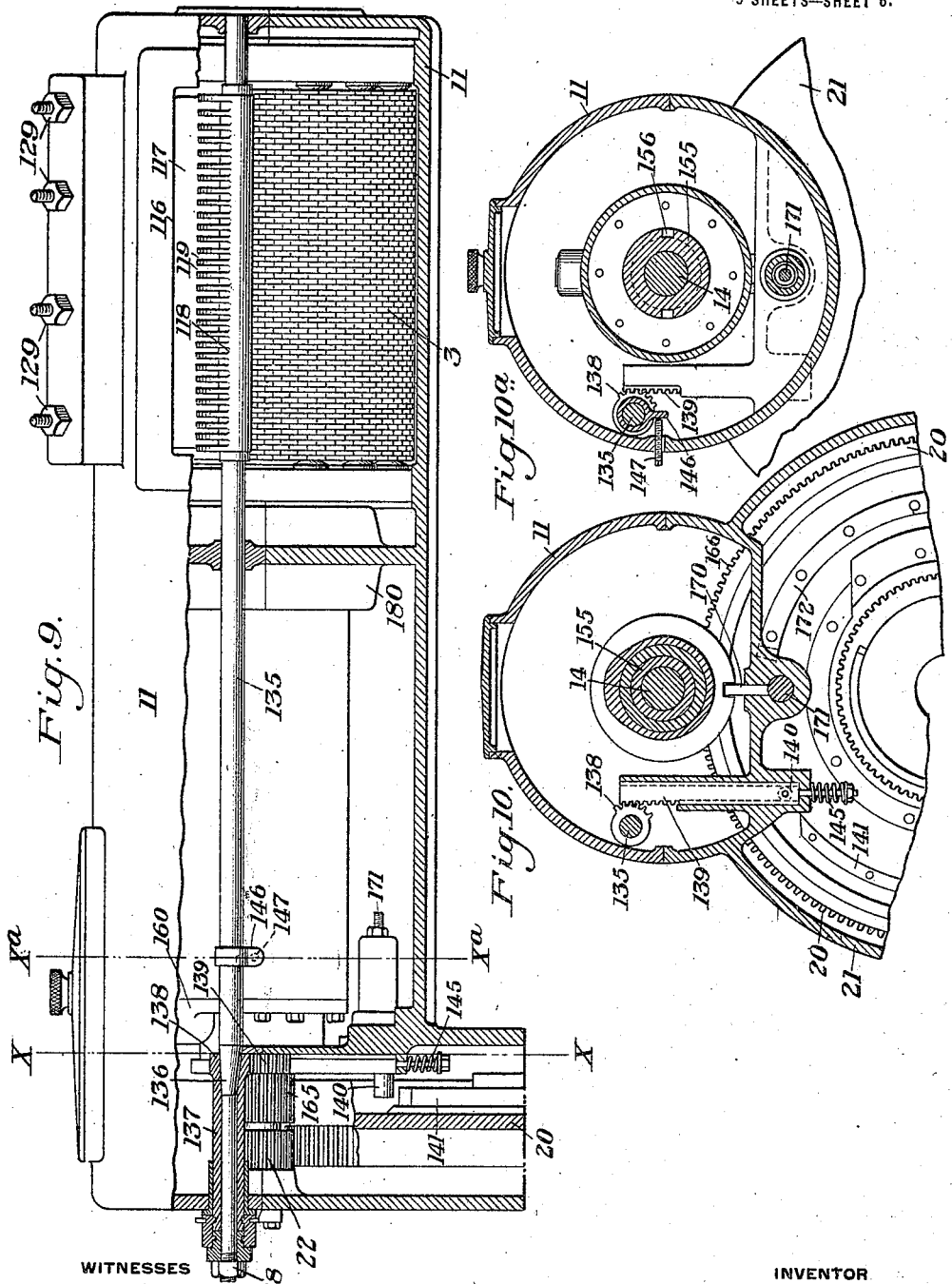
E. F. HULBERT.
MACHINE FOR FORMING SHELLS OF PAPER OR THE LIKE.
APPLICATION FILED DEC. 27, 1917. RENEWED OCT. 25, 1920.
1,380,103.
Patented May 31, 1921.
9 SHEETS—SHEET 6.

E. F. HULBERT.
MACHINE FOR FORMING SHELLS OF PAPER OR THE LIKE.
APPLICATION FILED DEC. 27, 1917. RENEWED OCT. 25, 1920.
1,380,103.
Patented May 31, 1921.
9 SHEETS—SHEET 7.
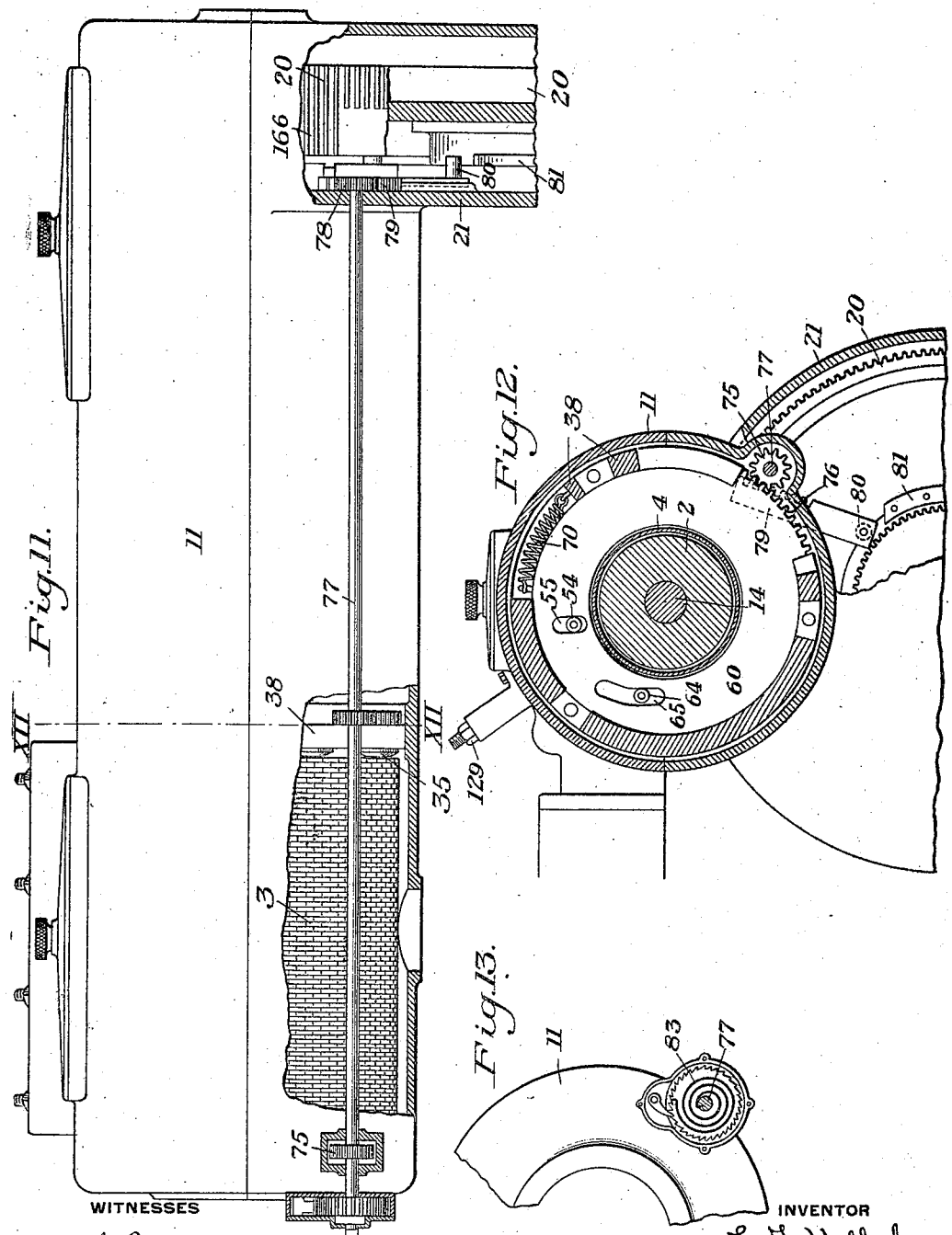

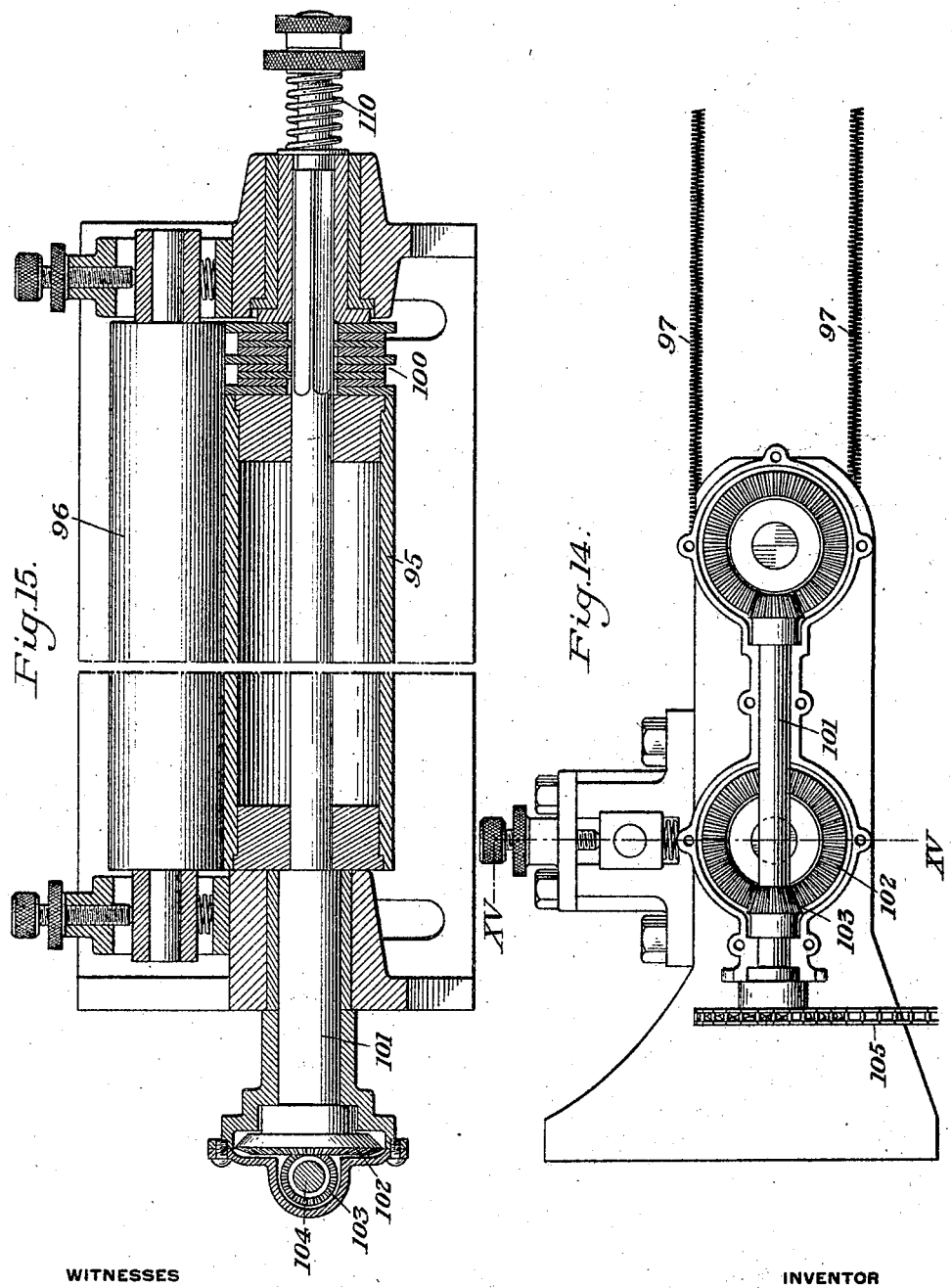

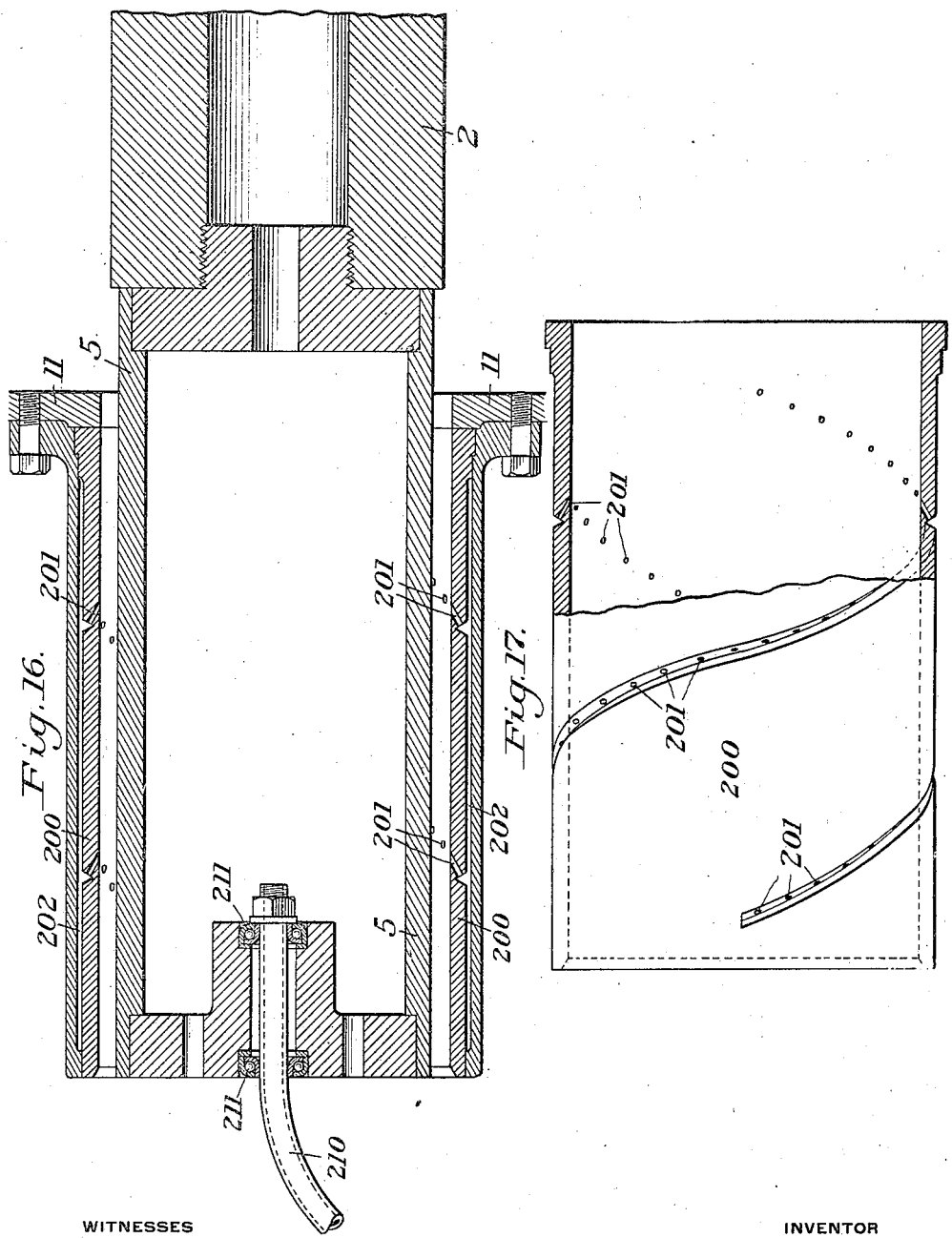

UNITED STATES PATENT OFFICE.

EDWIN F. HULBERT, OF MILWAUKEE, WISCONSIN, ASSIGNOR TO NATIONAL PAPER CAN COMPANY, OF MILWAUKEE, WISCONSIN, A CORPORATION OF DELAWARE.

MACHINE FOR FORMING SHELLS OF PAPER OR THE LIKE.

1,380,103.   Specification of Letters Patent.   Patented May 31, 1921.

Application filed December 27, 1917, Serial No. 209,184. Renewed October 25, 1920. Serial No. 419,483.

*To all whom it may concern:*

Be it known that I, EDWIN F. HULBERT, a citizen of the United States, residing at Milwaukee, in the county of Milwaukee and State of Wisconsin, have invented a new and useful Improvement in Machines for Forming Shells of Paper or the like, of which the following is a full, clear, and exact description, reference being had to the accompanying drawings, forming part of this specification, in which—

Figure 1 is a side elevation of the machine.

Fig. 2 is an end elevation of the machine.

Fig. 3 is a vertical longitudinal section through the winding head machine.

Figs. 4 and 5 are end elevations and vertical section, respectively, of the machine spur gear.

Fig. 6 is a vertical section through the chain-head and along the line VI—VI of Fig. 2.

Figs. 7 and 8 are detailed views of the chain.

Fig. 8ª is a detail showing one of the links.

Fig. 9 is an end elevation partly in section showing the means for operating the tension foot.

Fig. 10 is a vertical section along the line X—X of Fig. 9.

Fig. 10ª is a similar view on the line Xª—Xª of Fig. 9.

Fig. 11 is an end elevation partly in section showing the mechanism for tensioning the chain.

Fig. 12 is a section along the line XII—XII of Figs. 3 and 11.

Fig. 13 is an elevation of the spiral tension spring.

Fig. 14 is a side elevation of the tension rolls.

Fig. 15 is a section along the line XV—XV of Fig. 14.

Fig. 16 is a vertical section through the mandrel extension, and

Fig. 17 is a side elevation partly in section of the air stripper surrounding the mandrel extension.

The present invention relates to machines for winding shells, and more particularly to machines for winding open ended shells of paper or the like for use in makig cans or cartons. One feature of the machine relates to a chain belt surrounding the shell forming mandrel for tightly winding and consolidating the layers of material on it. Another feature relates to means for stripping or ejecting the wound shell from the winding mandrel. Another feature relates to a device for stripping the excess wax from the completed shell by air jets. Other features relate to certain arrangements and combinations of parts hereinafter more particularly pointed out, the advantages of which will be apparent to those skilled in the art from the following description.

Referring to the drawings which illustrate the preferred embodiment of the machine, the shell of paper or the like is wound from a strip upon a continuously rotating mandrel or former 2. The mandrel is surrounded by endless chain belt 3 which has a recurved portion nearly surrounding the mandrel. The strip of paper 6 is fed between the mandrel and surrounding chain belt and wound into a shell. During the winding operation the paper is preferably impregnated with a heated wax, such as paraffin. After the shell is wound it is removed from the mandrel by means of an ejector or stripper 4. The ejected shell then passes to the mandrel extension or stripper cylinder 5 where the excess wax on the shell is stripped or blown from its surface by air jets. After this the completed shell is delivered from the machine.

The machine has a standard 10 in which is inclosed a tank for holding beated paraffin. The paraffin in the tank is maintained liquid and at the proper heat. The tank also contains a pump, (not shown) for supplying paraffin to the winding head. The apparatus for heating and circulating the paraffin is the subject matter of my co-pending application, Serial No. 209,185, filed of even date herewith.

Carried on the above standard 10 is a cylinder housing or head 11, in which are housed the shell winding and ejecting mechanism. Carried in the head 11 is the shaft 14 which supports and drives the mandrel 2. The shaft 14 is continuously driven by a large spur gear 20 carried in a gear housing 21 below and at one end of the head 11. The gear ratio between the main spur gear 20 and the pinion 22 on the shaft 14 is twelve to one. One revolution of the gear 20 or twelve revolutions of the mandrel 2 constitute one cycle of the shell forming operations. The gear 20 is driven by an electric motor 25 through worm drive 26.

The gear 20 carries various gear teeth and cams for operating the ejector, the chain head tightening means and various other parts of the machine.

The mandrel 2 is made removable so that mandrels of various diameters may be employed in the machine. The mandrel has a reduced end 30 which fits over the end of the shaft 14 and is held thereon by a nut 31. The reduced end 30 of mandrel is surrounded by a bushing 32 which fits inside of the ejector 4 and serves as a supporting journal for the mandrel rotating within the ejector.

The belt 3 which coöperates with the mandrel is an endless chain belt running over a plurality of rolls 35, 36 and 37. The end rolls 36 and 37 are movable to tighten or release the chain around the mandrel 2, while the intermediate rolls 35 are fixed. The chain supporting rolls are supported in end plates 38 which in turn are rigidly supported inside of the machine head 11.

As shown in the drawings, the chain belt has a recurved portion 40 which nearly surrounds the mandrel 2. The belt is built up of a large number of chain links 41 held together by a plurality of long pintles 42. About 20,000 links are ordinarily used in making one of these chains. Each link 41 has its edges curved as shown at 43 and 44. The curvature shown at 43 has the same radius of curvature as the mandrel 2 while the curvature on the opposite side of the link at 44 is somewhat greater in order that the chain may be used with a larger mandrel. By forming the links with concave faces with the same radius curvature as the mandrel, the paper shell is smoothly pressed against the mandrel.

During the time that the paper strip 6 is being wound on the mandrel 2 and preferably for a few revolutions of the mandrel thereafter the chain 3 is held against the mandrel 2 under tension. After the shell is formed the chain is released from the mandrel to permit the ejector 4 to strip the completed shell from the mandrel. The mechanism for tightening and loosening the chain is as follows: The tightening and release of the chain is accomplished by the movement of the end chain supporting rollers 36 and 37. The roller 36 is supported in blocks 50 which travel endwise in slots 51 in the end frames 38. Each block 50 fits loosely in its supporting slot 51 and is yieldingly held against the lower sides thereof by a plate 52 pressed downwardly by springs 53. Projecting from the end of the roll beyond the blocks 50 are rollers 54 which engage in slots 55 formed in a rotatable cam plate 60.

The ends of the chain supporting roll 37 are similarly supported in blocks 61 held in substantially radial slots 62 formed through the end plates 38. Projecting beyond the blocks 61 are rolls 64 which engage in cam slots 65 in the cam plate 60. As shown, each cam slot 65 is somewhat wider than the diameter of its roll 64 and the roll 64 is held normally pressed against the one side of the slot 65 by a spring 63. The cam plate 60 is drawn in a direction to tighten the chain around the mandrel by means of a coiled spring 70 acting between the cam plate 60 and the end plate 38. At each end of the chain head are duplicate plates 60 and springs 70. As it will be apparent from the drawings, when the cam plate 60 is turned under the influence of the spring 70, the end rolls 36 and 37 will be moved to stretch the chain around the mandrel 2. The springs 53 and 63 are provided to allow the chain to yield slightly as the thickness of the paper shell being wound increases.

The chain is held under tension around the mandrel during eight of the twelve revolutions of the mandrel which constitute one cycle of operations. During the remaining four mandrel revolutions the stripper 4 is moved longitudinally over the mandrel by mechanism hereinafter described to push the wound shell therefrom. During the ejecting operation the tension of the chain is released by turning the cam plates 60 against the tension of the springs 70. This is done by cam operated pinions 75 which mesh with the gear teeth 76 on the cam plates 60. The pinions 75 are carried on a shaft 77 journaled at the bottom of the housing 11. The shaft 77 carries on its end a pinion 78 meshing with a rack 79 vertically movable in a slide formed in the housing 21 of the main spur gear. The rack carries a cam roll 80 which is arranged to be elevated by a cam 81 on the spur gear 20. When the cam 81 engages the cam roll, the pinions 75 are turned to release the chain. At the other end of the shaft 77 is carried a tension spring 83 which tends to turn the shaft 77 in a direction opposite to the action of the cam 81. The spring 83 is a strong spring and coöperates with the springs 70 in tightening the chain around the mandrel when the cam roll 80 is released by the cam 81. The ends of the chain pintles 42 are provided with conical end pieces 85 which permit the tapering nose 86 of the ejector 4 to push inside the chain when the ejector is moved over the mandrel.

The paper is fed to the shell forming mandrel 2 by means of feed rolls 95 and 96 which receive a strip 6 of paper of the proper length from a spring belt conveyer 97, the end of which is shown in Fig. 1. The conveyer and the associated mechanism for feeding the strips, forms the subject matter of my co-pending application, Serial No. 209,186 filed of even date herewith. The rolls 95 and 96 serve as combined feed rollers and tension rolls for the mandrel. The roll 95 is driven through the multiple disk clutch 100. The upper roll 96 is an idler roll for pressing the paper against the lower roll 95. The driving shaft 101 which extends through the roll 95 that carries the bevel gear 102 which is driven by pinion 103 carried on a short shaft 104. The shaft 104 is driven by means of a chain 105 running over a sprocket wheel 106 on the shaft of the driving motor 25. An adjusting spring 110 is provided for varying the pressure on the disks of the clutch 100.

The rolls 95 and 96 seize the end of the strip of paper delivered by the conveyer 97 and push the strip forward to the winding mandrel 2. The end of the strip is caught between mandrel 2 and chain 3 and wound on mandrel. The peripheral speed of the mandrel is greater than that of the feed roll 95, so that the strip is dragged through the feed roll 95 and 96 under tension, the multiple disk clutch 100 permitting the roll 95 to turn more rapidly than its shaft 101 in the forward direction. By adjusting the spring 110 the amount of drag or tension applied to the paper strip may be varied. The tension given to the strip serves to keep it taut and assists in the smooth winding of the shell.

The strip of paper 6 passes in through the opening 116 in the side of the head 11 and is guided to the mandrel 2 between a guide plate 117 and a guide arm 118. The guide arm 118 is ribbed at 119 to lessen friction.

The entering strip of paper is thoroughly impregnated with hot paraffin showered on it from the upper and lower spray heads 120 and 121, which are fed from the paraffin tanks in the base of the machine, and which shower the paper with hot liquid paraffin.

When the paper is fed to the mandrel and during the first part of the winding operation the guide arm 118 occupies position shown in Fig. 6 of the drawings, the bottom of the foot 125 being separated a small distance from the face of the mandrel. The foot 125 serves to guide the end of the strip which is being wound on the mandrel across the gap where the mandrel is uncovered by the chain. The foot is maintained in this position until all but about the last half wrap of the strip has been wound on the mandrel. Then the foot 125 is raised until the toe 126 is brought in contact with the lower end 127 of the plate 117, pinching paper between them. This serves as a final increased tension on the end of the strip and tends to pull the wraps of paper more closely together. The plate 117 is provided with springs 128 which yield when the toe 126 engages the plate and give a yielding pressure against the strip of paper. Nuts 129 are provided for adjusting the tension of springs 128.

Before the ejector 4 is moved over the mandrel, the foot 125 has been lifted out of the way of the ejector as above described. The mechanism for lifting foot 125 is as follows: The foot carrying arm 118 is fixed on a shaft 135 which extends longitudinally of the head 11. The end of the shaft is tapered at 136 and fits in the sleeve 137. The sleeve 137 has a pinion 138 which meshes with a vertical movable rack bar 139. The rack bar 139 has a cam roller 140 which is engaged with the cam 141 on the wheel 20. The rack bar 139 is normally drawn downwardly by a spring 145. When the roll 140 is not engaged by the cam 141, the shaft 135 is turned by spring 145 to bring the foot 125 close to the mandrel 2. The stop 146 on the shaft 135 engages an adjustable abutment 147 and limits the movement of the foot 125 toward the mandrel 2. When the cam roll 140 is raised by the cam 141, the shaft 135 is turned lifting the foot 125 away from the mandrel and against the end of the plate 117. A nut 148 is provided for drawing the taper 136 into the sleeve 137. By loosening the nut, the shaft 135 and sleeve 137 may be adjusted to vary the position and movement of the arm 118.

The chain 3 is driven solely by the mandrel 2. The chain supporting rolls 35 and 36 and 37 necessarily exert a friction drag on the chain, so that the chain tends to slip backwardly a little as it is driven by the mandrel on which the shell is being wound. The forward end of the paper strip which is in contact with the mandrel is of course carried forward with the mandrel, while the outer layer of paper is in contact with the surrounding chain and is held back somewhat by the chain. This action tends to pull the wrap of paper tighter on the mandrel. This tigtening due to the dragging tendency of the chain continues after the last lap has been wound and until the chain is released. Ordinarily the shells have four layers of paper. The paper is usually fed to the mandrel immediately after the chain is tightened around the mandrel, and about the first four revolutions of the mandrel are used for winding the shell. This leaves about three or four remaining revolutions of the mandrel before the chain is released, for the chain to press against and tighten the completed shell. The chain 3 is under a considerable tension. The paper is hot and is impregnated with hot paraffin. The pressure of the chain serves like a hot press to squeeze out any excess of paraffin or air bubbles which may be between the layers of paper and to firmly consolidate the layers into the shell wall.

After the shell is wound it is stripped from the mandrel 2 by the ejector 4. The moving of the ejector back and forth occupies the last four mandrel revolutions of the cycle. The mandrel continues to rotate during the ejecting operation. The ejector 4 has a nose piece 86 carried on ball-bearings 150. The nose piece 86 can therefore turn freely with the mandrel and prevents the edge of the shell engaged by it from being raised or roughened by the ejector. The ejector 4 is moved over the mandrel by means of the cam cylinder 155 in which is cut the cam groove 156. The rear end of the ejector 4 has a bearing block 160 which fits around the cam cylinder 155. Carried in the bearing block 160 is a pin 161 which engages the cam groove 156. The cam cylinder 155 is rotated by means of a pinion 165 carried on the end of the cylinder and which meshes with a mutilated gear 166 formed in the spur gear wheel 20. The ejector cam 155 is locked in its inoperative position by the locking pin 170 carried on spring pressed slides 171. The locking pin is released by a cam 172 on the side of the wheel 20, which engages a cam roll 173 on the slide 171.

The forward end of the ejector 4 is normally supported in a bearing 180 which surrounds the ejector, where the bushing 32 forms the supporting bearing for the mandrel 2. The ejector 4 is a cylinder of uniform diameter and as it travels longitudinally through its supporting bearing 180, the inside of the ejector serves as a supporting bearing for mandrel bushing 32. The ejector is thin and easily enters the space between the chain 3 and the mandrel 2. After the winding operation is completed and the chain released, the chain is running at the speed of the mandrel. Consequently there is considerable centrifugal force exerted on the portion 40 of the chain, which throws it out away from the mandrel leaving a free space around the mandrel for the ejector to enter. Usually the chain is thrown out so that the nose of the ejector enters easily, the pointed end pieces 85 on the chain pintles being employed as precaution in case the centrifugal force does not throw the chain clear of the mandrel.

The mandrel is partially surrounded by a shield 185 which confines the chain when it is free from the mandrel during operation. Drip holes 186 are provided for the excess paraffin to drain through. An excess of paraffin is supplied to the paper through the spray heads 120 and 121. This excess flows over the chain and is spattered over all of the moving parts of the head. The hot paraffin is a good lubricant and serves to lubricate the bearings. The excess of paraffin also serves to maintain the mandrel and chain at the proper heat for winding and consolidating the paper.

After the shell is ejected from the mandrel 2, it passes to the mandrel extension 5, where the excess paraffin is stripped from the surface of the shell. The mandrel extension 5 is secured to the free end of the mandrel. It is slightly less in diameter than the mandrel. The mandrel extension is surrounded by an air wiping or stripping head 200 which is secured to the end of the housing 11. The wiping head is provided with series of air jets 201 arranged in the form of a spiral. These jets are directed backwardly against the direction of rotation of the shell carried by the mandrel extension 5 and toward the end of the wiper head next the machine.

This arrangement of the jets serves to effectively push back the paraffin on the outside of the shell, the paraffin running back into the housing 11 from which it drips back to the paraffin tank in the base of the machine. The air wiper uniformly removes the excess of paraffin from the surface leaving just sufficient to form a glazed finish. The jets 201 are supplied with hot air from the air space 202 in the head 200. The air is supplied to the air space 202 by means of a suitable air compressing and heating device (not shown). After the shell is wiped of the excess paraffin, it is pushed off the mandrel extension by the next subsequent shell which is moved along by the ejector. The shell drops from the mandrel extension 5 along a guide 210 onto a cooling and conveying mechanism (not shown). The guide 210 is a curved rod, the end of which is carried in a ball bearing 211 in the end of the mandrel extension 5, so that it is free to hang downwardly.

The operation of the machine is continuous. Cut strips of the proper length are continually fed to the winding mechanism. The conveyer which supplies the sheets to the winding mechanism is so preferably timed that the forward end of a sheet enters the winding head just after the chain is contracted around the mandrel. If the shell is to have, for example, four thicknesses of paper, the shell is wound during the next four revolutions of the mandrel. Then the shell is subjected to the pressed and kneading action of the chain for about three or four revolutions, after which the chain is freed from mandrel. During the next four revolutions of mandrel the ejector moves forward and back over the mandrel, ejecting the completed shell. This completes the cycle of winding operations which take twelve revolutions of the mandrel. The cycle is then repeated, a fresh strip being supplied to the mandrel. The wound shells are continually pushed by the ejector 4 over the mandrel extension 5 and are delivered over the guide 210 to the conveyer which takes them away.

The machine is so constructed that shells of different diameters and widths may be wound. The widths of the shells may vary up to the length of the mandrel 2. For winding shells of different diameters mandrels of different sizes may be secured to the end of the mandrel driving shaft 14. Ejectors 5 of diameters corresponding to the mandrel may be secured to the ejector bearing block 160. Bearing bushing 180 of the proper size can be fitted to the machine. The chain head is removable and different chain heads carrying the proper chain belts for the different size mandrels may be inserted in the machine. The cam 141 which operates the tension 125 is removable and may be replaced with other cams of different lengths and properly time the operation of the tension foot, if a different number of wraps of paper are to be wound in the shell.

It will be apparent from the foregoing description that various changes and modifications may be made in the machine. The invention is not limited to its illustrated embodiment, but may be embodied in other structures within the scope of the following claims.

I claim:

1. A machine for winding shells of paper or the like, comprising a rotary mandrel and an endless inextensible chain belt cooperating therewith to press the material against the mandrel as it is wound, substantially as described.

2. A machine for winding shells of paper or the like, comprising a rotary mandrel, an endless inextensible chain belt having a recurved portion engaging and partially surrounding the mandrel for pressing the material against the mandrel as it is wound, substantially as described.

3. A machine for winding shells of paper or the like, comprising a rotary mandrel, an endless chain belt having a recurved portion engaging and partially surrounding the mandrel, means for ejecting the wound shell from the mandrel, and means for contracting the chain around the mandrel while the shell is being wound and for releasing the chain from the mandrel during the ejecting operation, substantially as described.

4. A machine for winding shells of paper or the like, comprising a rotary mandrel, and an endless free-running chain-belt engaging and partially surrounding the mandrel and having its links shaped to conform to the curvature of the mandrel, substantially as described.

5. A machine for winding shells of paper or the like comprising a rotary mandrel, an endless chain belt having a portion engaging and partially surrounding the mandrel and frictionally driven thereby, and a series of idler rolls on which the chain runs and is guided around the mandrel, substantially as described.

6. A machine for winding shells of paper or the like, comprising a rotary mandrel, an endless chain belt, a series of rolls for guiding the chain and holding it in position to engage and partially surround the mandrel, and means for shifting one or more of the rolls for tightening the chain around the mandrel and releasing it therefrom, substantially as described.

7. A machine for winding shells of paper or the like, comprising a rotary mandrel, an endless inextensible chain belt, means for bringing the chain belt into yielding engagement with the surface of the mandrel while the material is being wound thereon, substantially as described.

8. A machine for winding shells of paper or the like comprising a rotary mandrel, a chain belt, means for ejecting the wound shell from the mandrel, and means operating in timed relation to the ejecting means for bringing the chain into engagement with the surfaces of the mandrel during the winding operation and for releasing the chain from the mandrel during the ejecting operation, substantially as described.

9. A machine for winding shells of paper or the like, comprising a rotary mandrel, and an endless free-running chain belt cooperating therewith to press the material against the mandrel as it is wound, substantially as described.

10. A machine for winding shells of paper or the like, comprising a rotary mandrel, an endless free running belt engaging the mandrel during the winding operation for pressing the material against it, said belt being frictionally driven by contact with the material wound on the mandrel, substantially as described.

11. A machine for winding shells of paper or the like, comprising a rotary mandrel, an endless belt having a recurved portion engaging and nearly surrounding the mandrel, and a guide foot for bridging the gap where the belt does not engage the mandrel, substantially as described.

12. A machine for winding shells of paper or the like, comprising a rotary mandrel, an endless belt having a recurved portion engaging and nearly surrounding the mandrel, a guide foot for substantially bridging the gap where the chain does not engage the mandrel, an ejector moving over the mandrel for ejecting the wound shell therefrom and means for lifting the guide foot away from the mandrel during the ejecting operation, substantially as described.

13. A machine for winding shells of paper or the like, comprising a rotary mandrel, guides between which a strip of material is fed to the mandrel, and means for moving the guides together to engage and apply a tension to the strip of material near the completion of the winding operation, substantially as described.

14. A machine for winding shells of paper or the like, comprising a rotary mandrel, an endless belt engaging and nearly surrounding the mandrel, a guide for bridging the gap where the mandrel is not engaged by the belt, and means for moving the guide against a coöperating abutment and thereby engage the material being wound during the latter part of the winding operation to apply a tension thereto, substantially as described.

15. A machine for winding shells of paper or the like, comprising a rotary mandrel, an endless belt having a recurved portion engaging and partially surrounding the mandrel, means for ejecting the wound shell from the mandrel, and means for contracting the belt around the mandrel while the shell is being wound and for releasing the belt from the mandrel during the ejecting operation, substantially as described.

16. A machine for winding shells of paper or the like, comprising a rotary mandrel, and endless belt having a portion engaging and partially surrounding the mandrel, and frictionally driven thereby, and a series of idler rolls on which the belt runs and is guided around the mandrel, substantially as described.

17. A machine for winding shells of paper or the like comprising a rotary mandrel, an endless belt having a recurved portion engaging and partially surrounding the mandrel, an ejector movable longitudinally of the mandrel to strip the wound shell therefrom and adapted to pass between the belt and the mandrel, and means for releasing the belt from the mandrel to permit the ejector to pass beneath it, substantially as described.

18. A machine for winding shells of paper or the like, comprising a mandrel, a non-rotatable ejector movable longitudinally of the mandrel to strip the wound shell therefrom, and a gear for continuously rotating the mandrel having a mutilated portion for intermittently operating the ejector, substantially as described.

19. A machine for winding shells of paper or the like, comprising a rotary mandrel, an ejector sleeve movable longitudinally of the mandrel to strip the wound shell therefrom and forming on its inner surface a supporting bearing for the mandrel, substantially as described.

20. A machine for winding shells of paper or the like, comprising a rotary mandrel, a driving shaft therefor, an ejector sleeve, means for moving the ejector sleeve longitudinally over the mandrel to strip the wound shell therefrom comprising a cam cylinder surrounding the mandrel shaft, and means for intermittently rotating the cam cylinder to operate the ejector, substantially as described.

21. A machine for winding shells of paper or the like, comprising a mandrel, means coöperating therewith for impregnating a strip of material with wax and winding it into a shell on the mandrel, an ejector for stripping the wound shell from the mandrel, a mandrel extension to receive the shells ejected from the mandrel, and means operating on the shell carried by the mandrel extension for removing the surplus wax therefrom, substantially as described.

22. A machine for forming shells of paper or the like, comprising a mandrel and means coöperating therewith for forming a shell and impregnating it with wax, an ejector for stripping the shell from the mandrel, a holder for receiving the ejecting shell, means for directing a current of hot air against the shell on the holder for removing the surplus wax from the surface thereof, substantially as described.

23. A machine for forming shells of paper or the like, comprising means for forming a shell and impregnating it with wax, means for rotating the shell and means for directing a current of air against the shell while it is rotating to remove the surplus wax from the surface thereof, substantially as described.

24. A machine for forming shells of paper or the like, comprising a mechanism for winding a shell and impregnating it with wax, and a spirally arranged series of air jets for removing the surplus wax from the surface of the shell, substantially as described.

25. A machine for forming shells of paper or the like, comprising a rotary mandrel, mechanism coöperating therewith for forming a shell and impregnating it with wax, a mandrel extension in line with the mandrel and receiving the shell ejected from the mandrel, the ejector serving to move the ejected shells along and off of the mandrel extension, and means for directing a current of air against the shells as they move over the mandrel extension for removing the excess wax from the surfaces thereof, substantially as described.

26. A machine for winding shells of paper or the like, comprising a rotary mandrel, means for feeding a strip of paper to the mandrel, an endless belt, means for holding the belt around the mandrel while the strip is being wound and for a plurality of revolutions thereafter, and for releasing the belt from the mandrel, and means for stripping the wound shell from the mandrel, substantially as described.

27. A machine of the character described, comprising a winding mechanism for winding a strip of paper or the like into a shell, a feed roll for delivering the strip to the winding mechanism normally driven at a lower speed than the winding mechanism but having a slip connection for permitting it to act as a tension when the strip is drawn forwardly by the winding mechanism; substantially as described.

28. A machine of the character described, comprising a continuously rotating mandrel for winding a strip of paper or the like into a shell, a feed roll for feeding the end of a strip of paper to the mandrel and at a lower speed than that of the mandrel and operating as a tension for the strip after the mandrel begins to wind it up; substantially as described.

In testimony whereof I have hereunto set my hand.

EDWIN F. HULBERT.